(12) United States Patent
Kimura et al.

(10) Patent No.: US 9,864,068 B2
(45) Date of Patent: Jan. 9, 2018

(54) CIRCUIT, PHOTON DETECTOR, AND RADIATION ANALYZER

(71) Applicant: KABUSHIKI KAISHA TOSHIBA, Tokyo (JP)

(72) Inventors: Shunsuke Kimura, Kanagawa (JP); Hirokatsu Shirahama, Kanagawa (JP); Go Kawata, Kanagawa (JP); Masanori Furuta, Kanagawa (JP); Hideyuki Funaki, Tokyo (JP); Tetsuro Itakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 89 days.

(21) Appl. No.: 14/947,317

(22) Filed: Nov. 20, 2015

(65) Prior Publication Data

US 2016/0274246 A1  Sep. 22, 2016

(30) Foreign Application Priority Data

Mar. 19, 2015  (JP) .................. 2015-056285

(51) Int. Cl.
*G01T 1/24* (2006.01)
*G01T 1/17* (2006.01)

(52) U.S. Cl.
CPC ..................... *G01T 1/17* (2013.01)

(58) Field of Classification Search
CPC ...... H01L 27/0259; H02M 2001/0009; H02M 3/33507; H03F 2200/72; H03F 3/601; G01T 1/17; H03G 1/0029

USPC ....................................................... 250/370.14
See application file for complete search history.

(56) References Cited

U.S. PATENT DOCUMENTS

| 7,256,414 | B2 | 8/2007 | Yamaguchi |
| 2007/0170991 | A1* | 7/2007 | Tanaka ...................... H03F 1/32 330/278 |
| 2010/0301193 | A1 | 12/2010 | Guellec et al. |
| 2011/0129224 | A1 | 6/2011 | Umeda |
| 2013/0027822 | A1* | 1/2013 | Smith ................. H01L 27/0259 361/56 |
| 2014/0048717 | A1* | 2/2014 | Tanaka ...................... G01T 1/16 250/395 |
| 2014/0224963 | A1* | 8/2014 | Guo ...................... G01T 1/2985 250/208.1 |
| 2015/0108328 | A1* | 4/2015 | Guo ...................... H04N 5/361 250/208.1 |

FOREIGN PATENT DOCUMENTS

| JP | 7-46068 | 2/1995 |
| JP | 2005-266072 | 9/2005 |
| JP | 2011-67527 | 4/2011 |

(Continued)

*Primary Examiner* — Taeho Jo
(74) *Attorney, Agent, or Firm* — Finnegan, Henderson, Farabow, Garrett & Dunner L.L.P.

(57) ABSTRACT

According to an embodiment, a circuit includes a shunt and a controller. The shunt shunts input current into a plurality of current paths. The controller controls a gain of current inputted to the shunt by combining the current that is shunted into the current paths by the shunt in combination corresponding to a first signal from the outside or changing a shunt ratio with which the shunt shunts the current into the current paths corresponding to the first signal.

8 Claims, 11 Drawing Sheets

(56) References Cited

FOREIGN PATENT DOCUMENTS

| | | |
|---|---|---|
| JP | 5107440 | 12/2012 |
| JP | 5320841 | 10/2013 |
| JP | 2014-160066 | 9/2014 |

* cited by examiner

CIRCUIT, PHOTON DETECTOR, AND RADIATION ANALYZER

CROSS-REFERENCE TO RELATED APPLICATION

This application is based upon and claims the benefit of priority from Japanese Patent Application No. 2015-056285, filed on Mar. 19, 2015; the entire contents of which are incorporated herein by reference.

FIELD

Embodiments described herein relate generally to a circuit, a photon detector, and a radiation analyzer.

BACKGROUND

A radiation detector generally includes a photon detector for detecting photons generated by radiation that is incident on a phosphor such as a scintillator, an amplifier for amplifying signals detected by the photon detector, and an analog-to-digital (A/D) converter for analog-to-digital-converting (A/D-converting) the signals amplified by the amplifier. In this case, an output dynamic range of the A/D converter is maximum in the dynamic ranges of energy due to the radiation acquired by the radiation detector. Causing a radiation detector to effectively detect radiation requires a combined gain of a photon detector and an amplifier serving as input stages of an A/D converter to be close to the dynamic range of the A/D converter.

In a radiation detector of a photon counting system used under a high counting condition such as medical uses, an avalanche photodiode (APD (silicon photo multiplier (SiPM)) operating in the Geiger mode, a photomultiplier tube and the like are used as a photon detector. Output from a photon detector is a high-speed current pulse. Accordingly, a circuit that serves as an interface of a photon detector is required to be wideband. When a photon detector is included in X-ray computed tomography (CT) and the like, a large number of detectors and detecting devices are required to be disposed in a limited space such as a gantry, and the photon detector is required to have low power consumption.

However, conventionally, an operational amplifier having a large gain bandwidth and high power consumption has been used for configuring a circuit that is wideband and causes a band to remain constant even after gain control.

BRIEF DESCRIPTION OF THE DRAWINGS

FIG. 12 is a timing chart illustrating the operation of the variable gain integrator and the like;

DETAILED DESCRIPTION

According to an embodiment, a circuit includes a shunt and a controller. The shunt shunts input current into a plurality of current paths. The controller controls a gain of current inputted to the shunt by combining the current that is shunted into the current paths by the shunt in combination corresponding to a first signal from the outside or changing a shunt ratio with which the shunt shunts the current into the current paths corresponding to the first signal.

Figure 1:
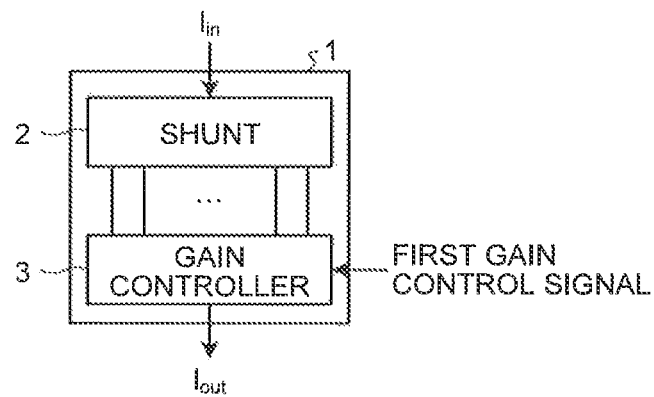
FIG. 1 is a block view illustrating the configuration of a current buffer included in an integrated circuit according to an embodiment.

FIG. 1 is a block view illustrating the configuration of a current buffer 1 included in a first integrated circuit according to an embodiment. As illustrated in FIG. 1, the current buffer 1 includes a shunt 2 and a gain controller 3, and is capable of changing a gain corresponding to a first gain control signal. A gain of a current buffer is an amplification factor of output current to input current. The current buffer 1 may be formed in, for example, an integrated circuit of a complementary metal oxide semiconductor (CMOS) process, and may be integrated with other circuits.

The shunt 2 shunts input current into a plurality of current paths. The gain controller 3 combines current shunted into a plurality of current paths by the shunt 2 in combination corresponding to the first gain control signal from the outside so as to control a gain of the current inputted to the shunt 2. The gain controller 3 may also change a shunt ratio with which the shunt 2 shunts current into a plurality of current paths corresponding to the first gain control signal from the outside so as to control a gain of the current inputted to the shunt 2.

Figure 2:
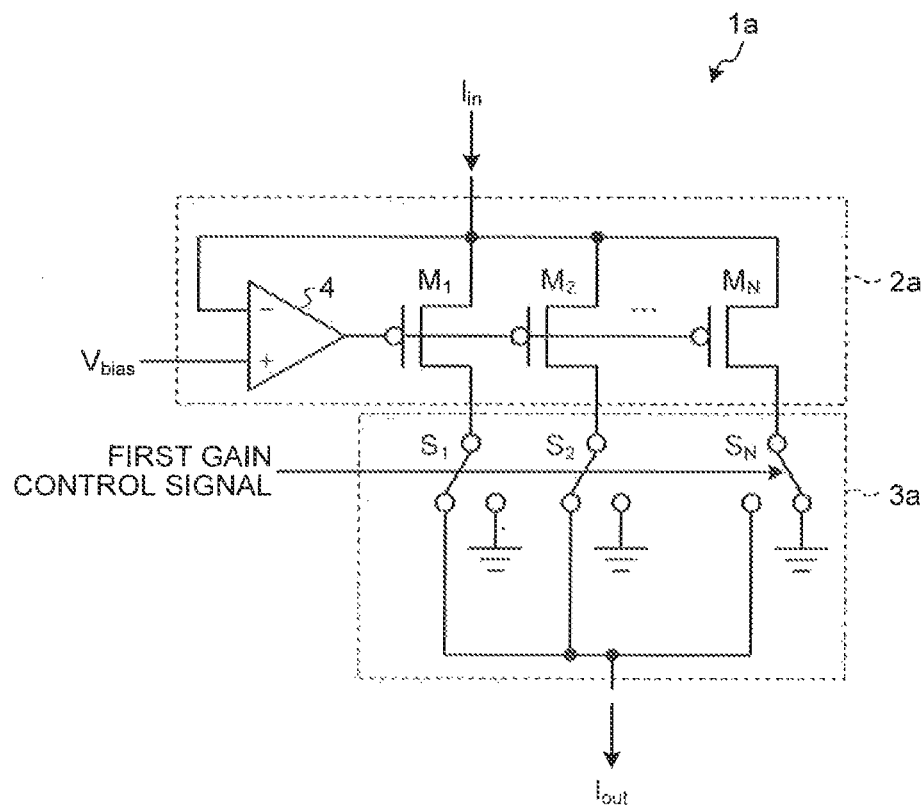
FIG. 2 is a view illustrating a first configuration example of the current buffer.

The following describes a specific configuration example of a current buffer included in the first integrated circuit according to the embodiment. FIG. 2 is a view illustrating a first configuration example (current buffer 1a) of the current buffer. As illustrated in FIG. 2, the current buffer 1a includes a shunt 2a and a gain controller 3a, and is capable of changing a gain of output current $I_{out}$ to input current $I_{in}$ corresponding to the first gain control signal.

The shunt 2a includes N transistors $M_1$ to $M_N$ and a regulation amplifier 4. In the regulation amplifier 4, non-inverting input is fixed to any desired bias voltage (reference voltage) $V_{bias}$, inverting input is short-circuited to each source terminal of the transistors $M_1$ to $M_N$ and, and an output terminal is connected to each gate terminal of the transistors $M_1$ to $M_N$. In this manner, the shunt 2a is a shunt circuit having the regulated cascode configuration, and shunts input current into N pieces of current. A size coefficient m of each of the transistors $M_1$ to $M_N$ is, for example, 1.

The gain controller 3a switches on/off N switches $S_1$ to $S_N$ corresponding to the first gain control signal inputted from the outside so as to switch whether each drain terminal of N transistors $M_1$ to $M_N$ as output of the shunt 2a is grounded or connected to an output end. Drain current flowing through a transistor whose drain terminal is grounded is discarded.

The gain controller 3a changes a gain of output current corresponding to the number of switches indicating that grounding is selected. For example, if the number of switches indicating that grounding is selected is k, a gain of output current becomes (N−k)/N times. Each of the transistors selects either grounding or output, and input impedance is represented by, using gm that indicates combined mutual conductance of the transistors $M_1$ to $M_N$ and a gain A of the regulation amplifier 4, 1/(A×gm). A gain of an amplifier such as the regulation amplifier 4 is an amplification factor of an output voltage to an input voltage.

Input of the current buffer 1a can be wideband because an input band is determined by input impedance and a parasitic capacity. The current buffer 1a may be weighted with the size coefficient m of each of the transistors $M_1$ to $M_N$ so as to change a variation function of a gain corresponding to the selection of switches.

Figure 3:
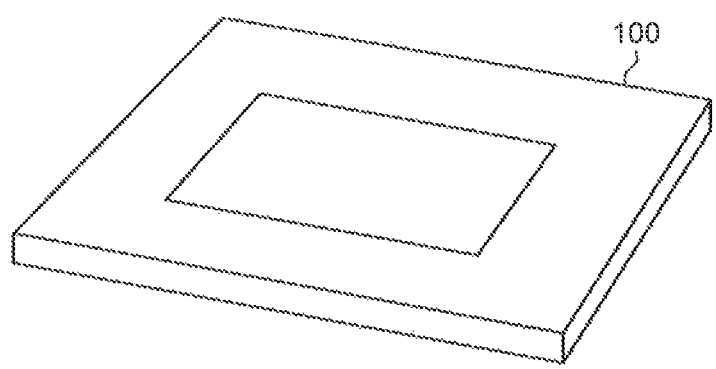
FIG. 3 is a perspective view illustrating the outline of the external appearance of an integrated circuit including the current buffer.

FIG. 3 is a perspective view illustrating the outline of the external appearance of an integrated circuit 100 including the current buffer 1a. The current buffer 1a is integrated, for example, in a chip of the CMOS process, and is sealed in a package.

Figure 4A:
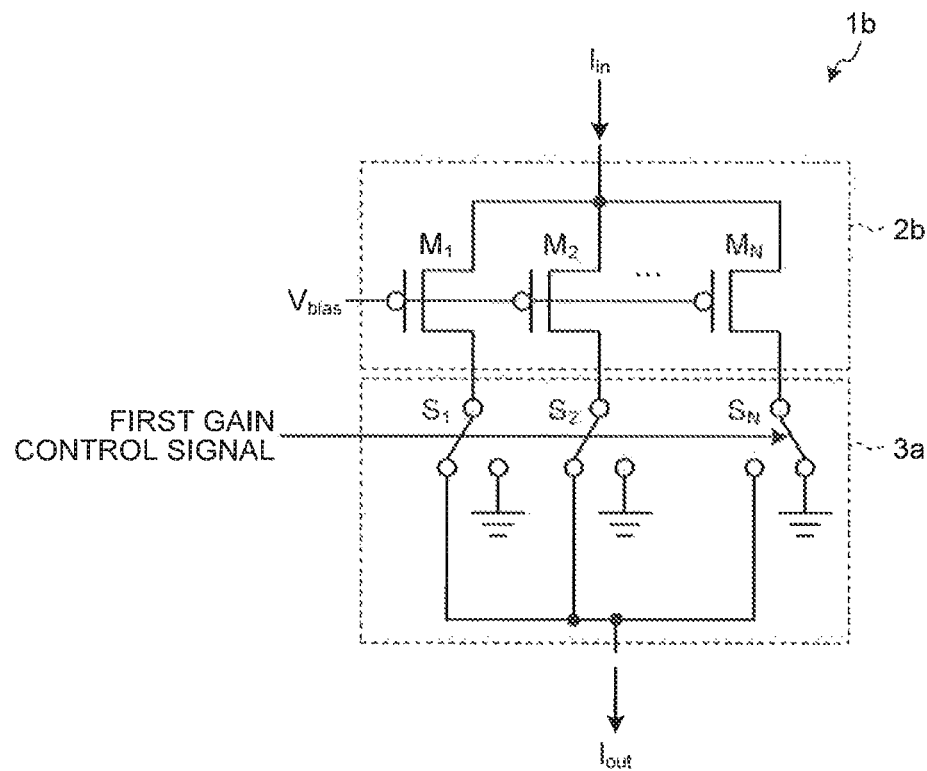
FIGS. 4A and 4B are views illustrating a second configuration example of and a modification of the current buffer, respectively.
Figure 4B:
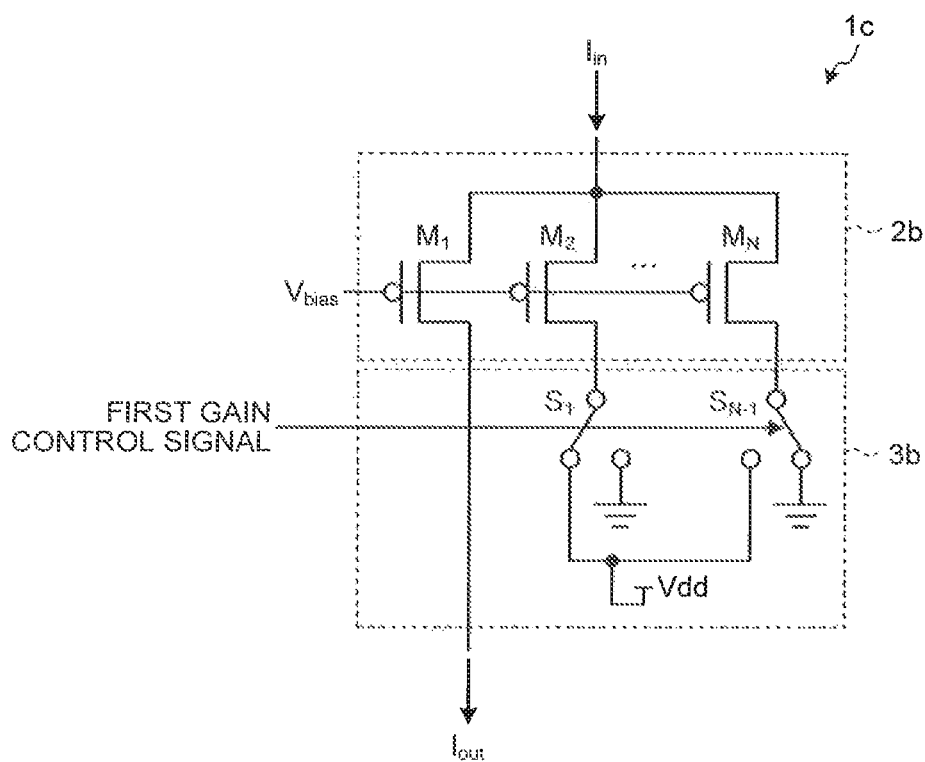

The following describes a plurality of configuration examples of the current buffer 1. FIGS. 4A and 4B are views illustrating a second configuration example (current buffer 1b) of and a modification (current buffer 1c) of the current buffer, respectively. As illustrated in FIG. 4A, the current buffer 1b includes a shunt 2b and the gain controller 3a, and is capable of changing a gain of output current $I_{out}$ to input current $I_{in}$ corresponding to the first gain control signal.

The current buffer 1b is different from the current buffer 1a illustrated in FIG. 2 in that no regulation amplifier 4 is provided to the shunt 2b. In other words, the current buffer 1b provides no regulation amplifier 4 to the shunt 2b, and has the configuration of a gate grounding amplifier circuit where any desired bias voltage $V_{bias}$ is applied to each gate terminal of N transistors $M_1$ to $M_N$.

As illustrated in FIG. 4B, the current buffer 1c includes the shunt 2b and a gain controller 3b, and is capable of changing a gain of output current $I_{out}$ to input current $I_{in}$ corresponding to the first gain control signal. The gain controller 3b switches on/off (N−1) switches $S_1$ to $S_{N-1}$ corresponding to the first gain control signal inputted from the outside so as to switch, for example, whether each drain terminal of (N−1) transistors $M_2$ to $M_N$ as output of the shunt 2b is grounded or connected to voltage drain (Vdd).

The gain controller 3b changes a shunt ratio of drain current flowing through the transistor $M_2$ (in other words, output current $I_{out}$) to input current $I_{in}$ corresponding to the number of switches indicating that grounding is selected. When a drain terminal of a transistor is connected to Vdd, the gain controller 3b has a gain control width different from that of the gain controller 3a illustrated in FIG. 2.

Figure 5A:
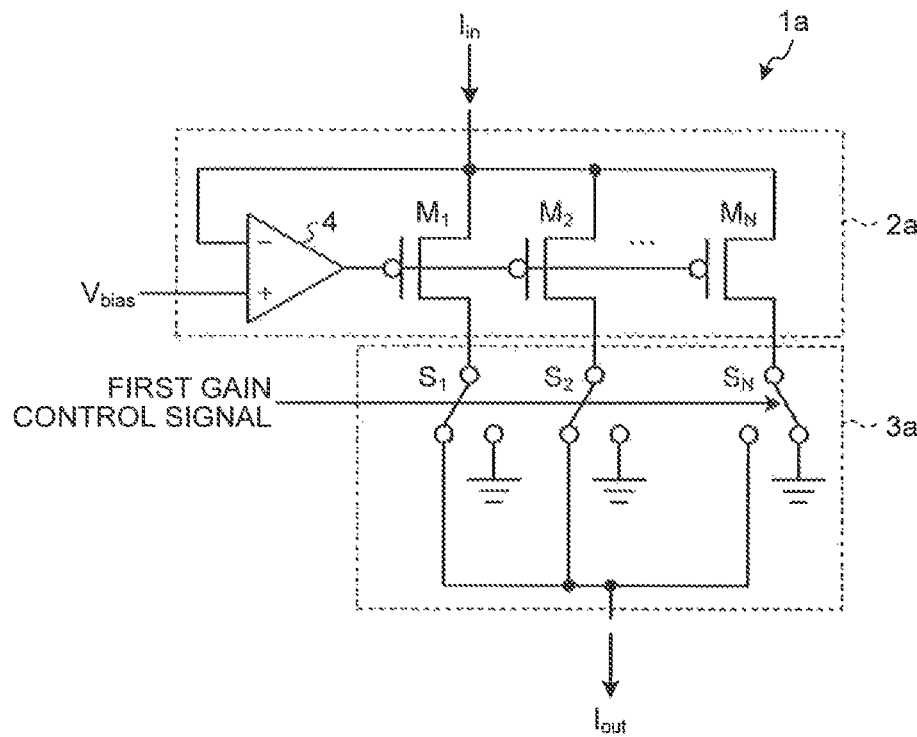
FIGS. 5A and 5B are a view illustrating modifications of the current buffer.
Figure 5B:
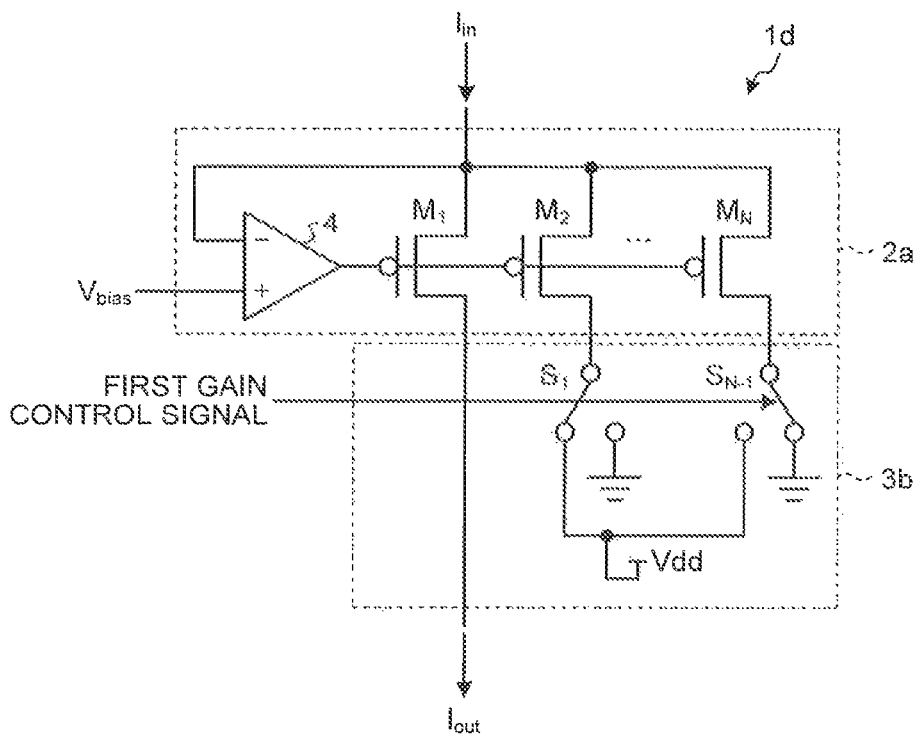

FIG. 5B is a view illustrating a modification (current buffer 1d) of the current buffer 1a. The gain controller 3a in the current buffer 1a illustrated in FIG. 5A is replaced with the gain controller 3b in the current buffer 1d illustrated in FIG. 5B.

Figure 6:
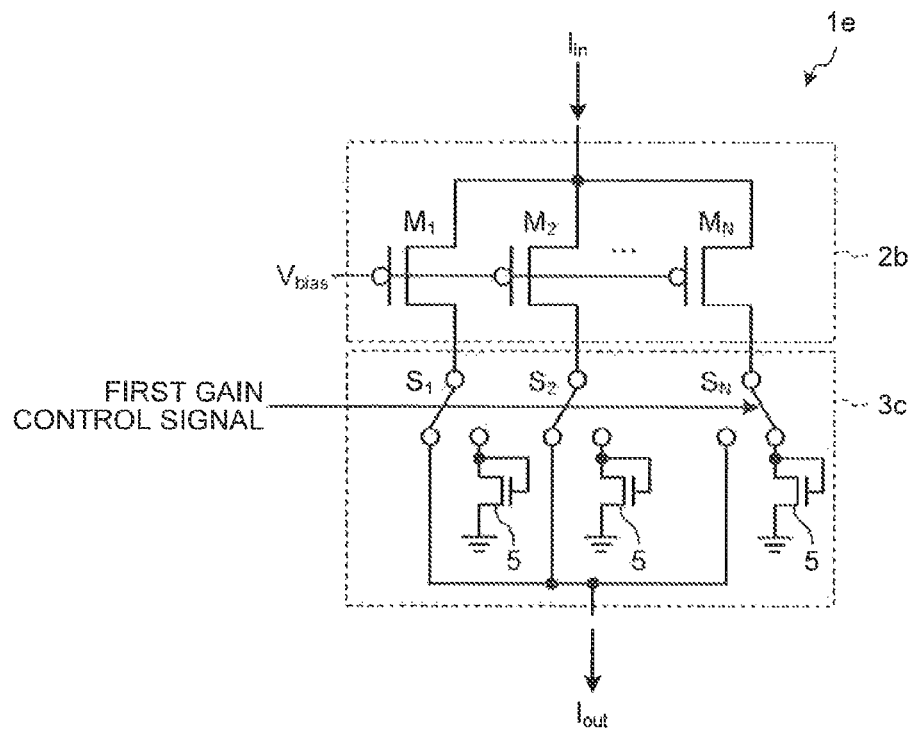
FIG. 6 is a view illustrating a third configuration example of the current buffer.

FIG. 6 is a view illustrating a third configuration example (current buffer 1e) of the current buffer. As illustrated in FIG. 6, the current buffer 1e includes the shunt 2b and a gain controller 3c, and is capable of changing a gain of output current $I_{out}$ to input current $I_{in}$ corresponding to the first gain control signal.

The current buffer 1e is different from the current buffer 1b illustrated in FIG. 4A in that transistors 5 functioning as diodes are provided on the grounding side of N switches $S_1$ to $S_N$ in the gain controller 3c. In other words, the gain controller 3c discards current shunted through the transistors 5 so as to control a gain of current inputted to the shunt 2b.

The transistors 5 are provided corresponding to, for example, the size of a transistor connected to a rear stage of the current buffer 1e (transistor in a circuit at a rear stage to which output current $I_{out}$ is input). In the current buffer 1e, the transistors 5 are provided to N switches $S_1$ to $S_N$ so as to align impedance of each of the transistors $M_1$ to $M_N$. The transistors 5 may be provided in the current buffer 1 in any configuration example.

Figure 7:
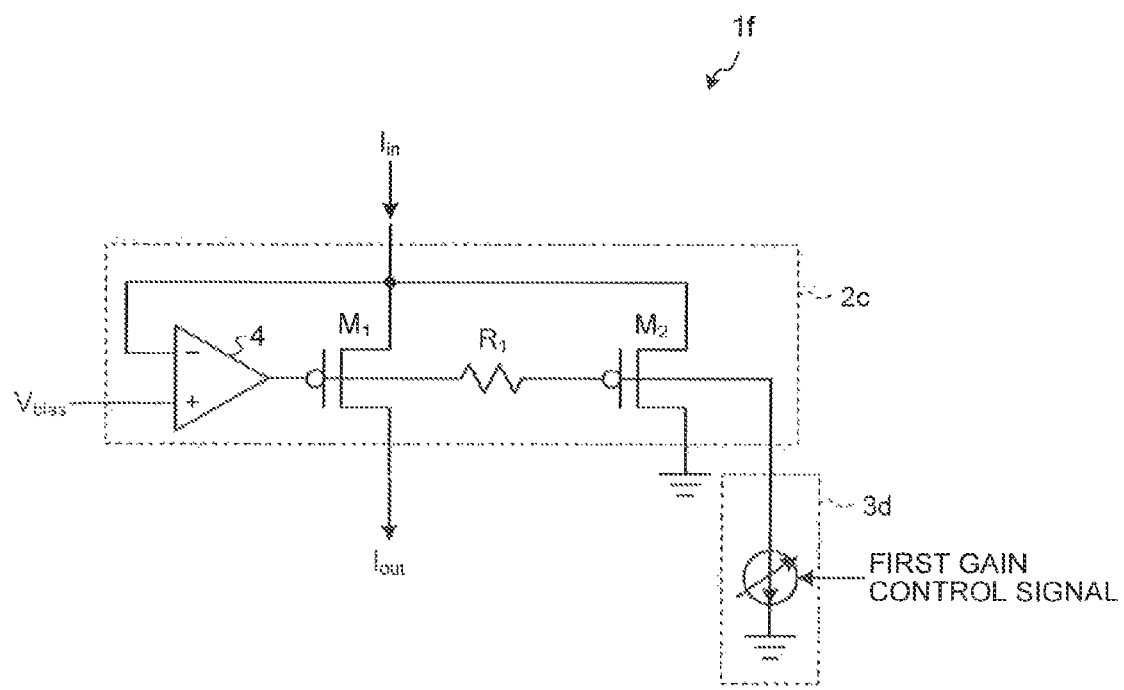
FIG. 7 is a view illustrating a fourth configuration example of the current buffer.

FIG. 7 is a view illustrating a fourth configuration example (current buffer 1f) of the current buffer. As illustrated in FIG. 7, the current buffer 1f includes a shunt 2c and a gain controller 3d, and is capable of changing a gain of output current $I_{out}$ to input current $I_{in}$ corresponding to the first gain control signal.

The shunt 2c includes the transistors $M_1$ and $M_2$, a resistor $R_1$, and the regulation amplifier 4. In the regulation amplifier 4, non-inverting input is fixed to any desired bias voltage (reference voltage) $V_{bias}$, and inverting input is short-circuited to each source terminal of the transistors $M_1$ and $M_2$. In the regulation amplifier 4, an output terminal is connected to a gate terminal of the transistor $M_2$ biased by the gain controller 3d serving as a variable power source through the transistor $M_1$ and the resistor $R_1$. In this manner, the shunt 2c is a shunt circuit having the regulated cascode configuration and shunts input current. A size coefficient m of each of the transistors $M_1$ and $M_2$ is, for example, 1.

Where Vg1 is defined as a gate potential of the transistor $M_1$ and $I_{adj}$ is defined as a current value of the gain controller 3d, a gate potential Vg2 of the transistor $M_2$ is represented by $Vg2 = Vg1 - R_1 \times I_{adj}$.

The gain controller 3d changes the current $I_{adj}$ flowing therein corresponding to the first gain control signal inputted from the outside so as to output current that is output from the transistor $M_1$ as a result of shunting the input current $I_{in}$ with a ratio of Vg2/Vg1.

Figure 8:
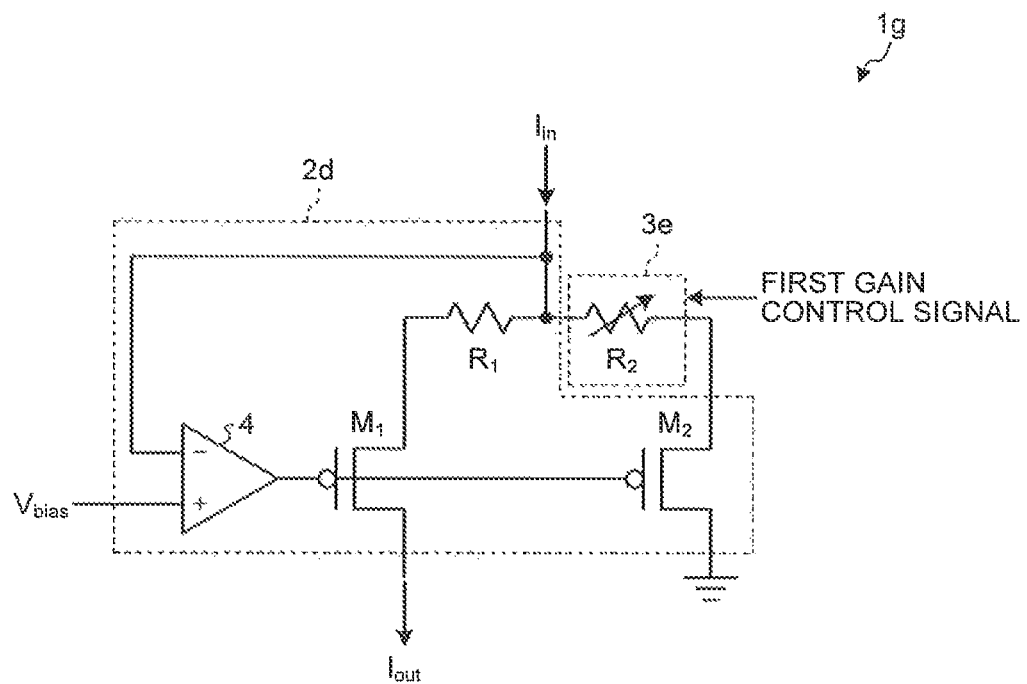
FIG. 8 is a view illustrating a fifth configuration example of the current buffer.

FIG. 8 is a view illustrating a fifth configuration example (current buffer 1g) of the current buffer. As illustrated in FIG. 8, the current buffer 1g includes a shunt 2d and a gain controller 3e, and is capable of changing a gain of output current $I_{out}$ to input current $I_{in}$ corresponding to the first gain control signal.

The shunt 2d includes the transistors $M_1$ and $M_2$, a fixed resistor $R_1$, and the regulation amplifier 4. One end of the fixed resistor $R_1$ is connected to a source of the transistor $M_1$ and the other end thereof is connected to an input terminal of the regulation amplifier 4. In the regulation amplifier 4, non-inverting input is fixed to any desired bias voltage $V_{bias}$, inverting input is short-circuited to an input terminal of the shunt 2d, and an output terminal is connected to each gate terminal of the transistors $M_1$ and $M_2$. A size coefficient m of each of the transistors $M_1$ and $M_2$ is 1. In this manner, the shunt 2d is a shunt circuit having the regulated cascode configuration and shunts input current.

The gain controller 3e is a variable resistor $R_2$ having one end connected to a source terminal of the transistor $M_2$ and the other end connected to an input terminal of the shunt 2d, and changes a resistance value corresponding to the first gain control signal inputted from the outside so as to output current that is output from the transistor $M_1$ as a result of shunting. When a resistance value of the fixed resistor $R_1$ is defined as r and a resistance value of the variable resistor $R_2$ is defined as $r_{adj}$, drain current flowing through the transistor $M_1$, in other words, output current $I_{out}$ is represented by $I_{in}/r_{adj}/(r+r_{adj})$.

Figure 9:
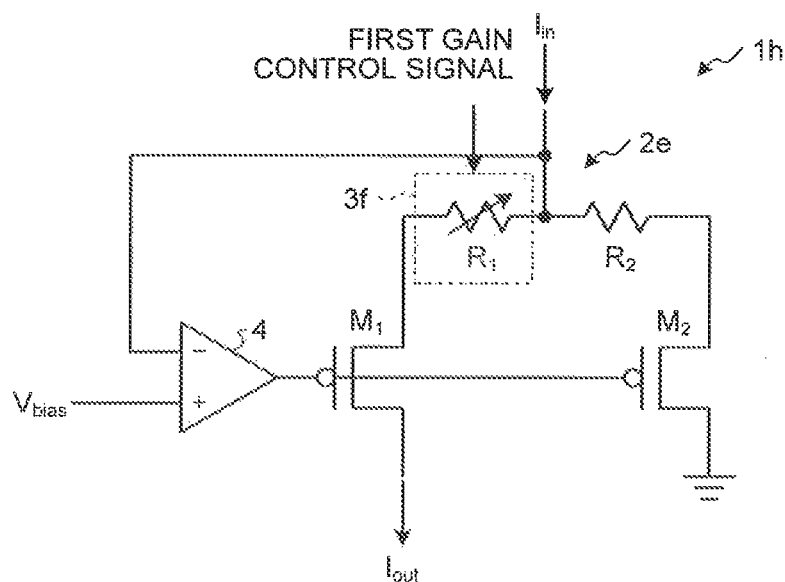
FIG. 9 is a view illustrating a sixth configuration example of the current buffer.

FIG. 9 is a view illustrating a sixth configuration example (current buffer 1h) of the current buffer. As illustrated in FIG. 9, the current buffer 1h includes a shunt 2e and a gain controller 3f, and is capable of changing a gain of output current $I_{out}$ to input current $I_{in}$ corresponding to the first gain control signal.

The shunt 2e includes the transistors $M_1$ and $M_2$, a fixed resistor $R_2$, and the regulation amplifier 4. One end of the fixed resistor $R_2$ is connected to a source of the transistor $M_2$ and the other end thereof is connected to an input terminal of the shunt 2e. In the regulation amplifier 4, non-inverting input is fixed to any desired bias voltage $V_{bias}$, inverting input is short-circuited to an input terminal of the shunt 2e, and an output terminal is connected to each gate terminal of the transistors $M_1$ and $M_2$. A size coefficient m of each of the transistors $M_1$ and $M_2$ is 1. In this manner, the shunt 2e is a shunt circuit having the regulated cascode configuration and shunts input current.

The gain controller 3f is a variable resistor $R_1$ having one end connected to a source terminal of the transistor $M_1$ and the other end connected to an input terminal of the regulation amplifier 4, and changes a resistance value corresponding to the first gain control signal inputted from the outside so as to output current that is output from the transistor $M_1$ as a result of shunting. Where r is defined as a resistance value of the fixed resistor $R_2$ and $r_{adj}$ is defined as a resistance value of the variable resistor $R_1$, drain current flowing through the transistor $M_1$, in other words, output current $I_{out}$ is represented by $I_{in} \times r_{adj}/(r+r_{adj})$.

In this manner, the current buffer 1 adjusts a gain of current inputted to the shunt 2 by combining the current shunted into a plurality of current paths by the shunt 2 in combination corresponding to the first gain control signal from the outside or by changing a shunt ratio with which the shunt 2 shunts the current into a plurality of current paths corresponding to the first gain control signal from the outside. Accordingly, the current buffer 1 can reduce power consumption and adjust a gain of output current in a wide band.

Figure 10:
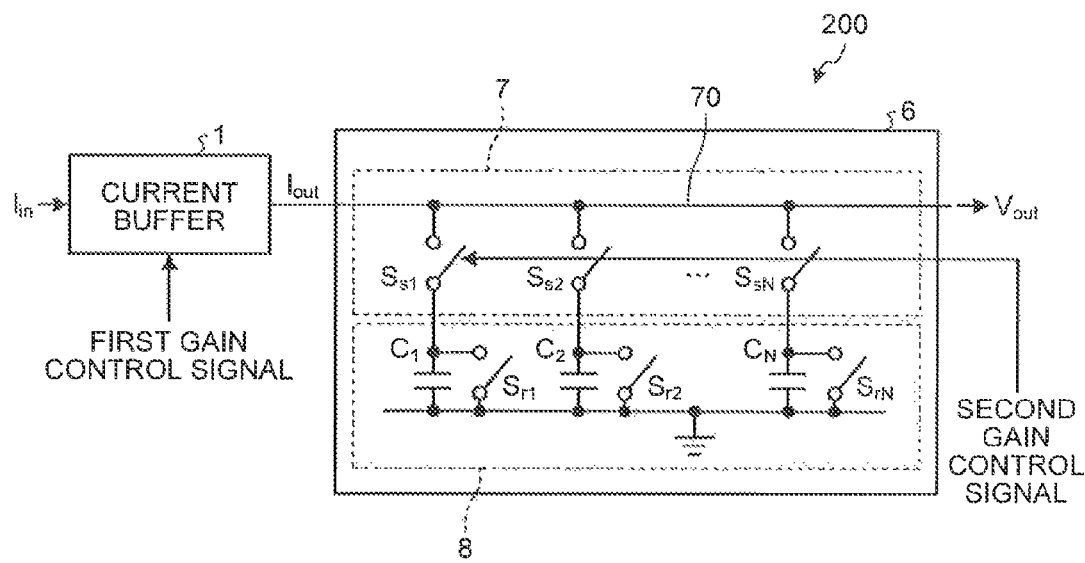
FIG. 10 is a view illustrating the configuration of a current integrator included in an integrated circuit according to the embodiment.

The following describes a current integrator included in a second integrated circuit according to the embodiment. FIG. 10 is a view illustrating the configuration of a current integrator 200 included in the second integrated circuit according to the embodiment. As illustrated in FIG. 10, the current integrator 200 includes the current buffer 1 and a variable gain integrator 6 having a gain control function, and is capable of changing a gain corresponding to the first gain control signal and a second gain control signal. A gain of the variable gain integrator 6 is conversion magnification of output voltage to input current.

The variable gain integrator 6 includes a switch unit 7 and a storage 8. The switch unit 7 includes N selection switches $S_{s1}$ to $S_{sN}$ and an integration node 70, and outputs the sum of electric charges stored in the storage 8 as a voltage through the integration node 70. The storage 8 includes N capacitors $C_1$ to $C_N$ and N reset switches $S_{r1}$ to $S_{rN}$, and performs current/voltage conversion (stores electric charges) and performs reset corresponding to the operation of each selection switch in the switch unit 7 and each reset switch. The variable gain integrator 6 is capable of changing a current/voltage conversion gain by changing the number of the selection switches to be turned on corresponding to the second gain control signal inputted from the outside.

Figure 11:
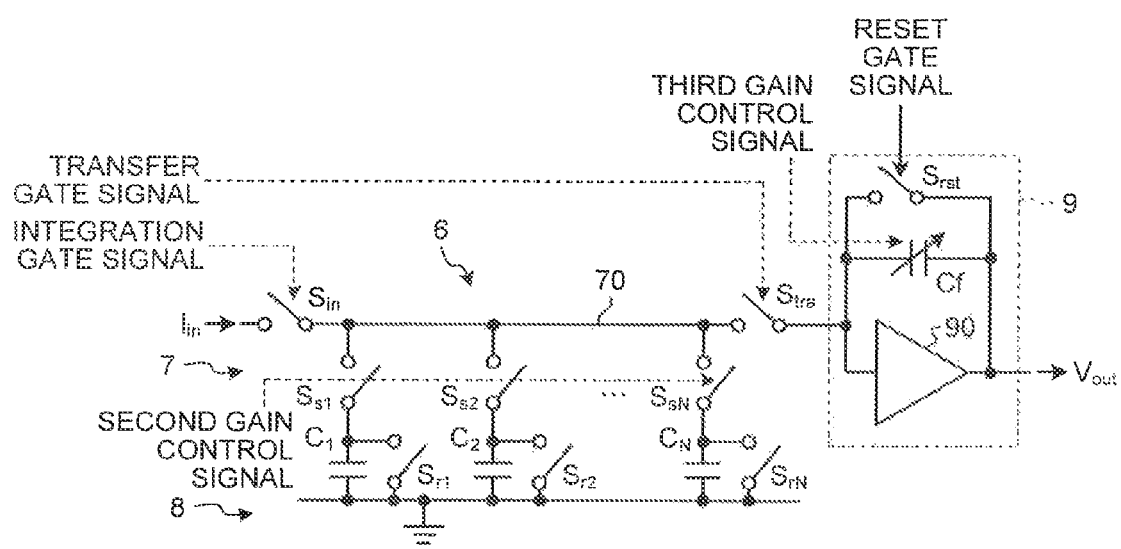
FIG. 11 is a view illustrating the configuration around a variable gain integrator in the current integrator.

The following describes a modification of the second integrated circuit according to the embodiment. FIG. 11 is a view illustrating the configuration around the variable gain integrator 6 in the current integrator 200 included in the second integrated circuit in the modification according to the embodiment. As illustrated in FIG. 11, the second integrated circuit in the modification includes a converter 9 connected through a switch $S_{in}$ provided to a front stage of the variable gain integrator 6 and a switch $S_{tra}$ provided to a rear stage of the variable gain integrator 6.

The switch $S_{in}$ short-circuits the current buffer 1 and the variable gain integrator 6 corresponding to an integration gate signal inputted from the outside. In other words, when the switch $S_{in}$ is turned on, output current $I_{out}$ output from the current buffer 1 becomes input current $I_{in}$ to the variable gain integrator 6.

The converter 9 includes an amplifier 90, a variable capacity (or a fixed capacity) Cf provided to a feedback unit of the amplifier 90, and a switch $S_{rst}$, and converts impedance of the variable gain integrator 6 while converting a gain of a voltage changed by the variable gain integrator 6. A capacity value of the variable capacity Cf is changed corresponding to a third gain control signal inputted from the outside. The switch $S_t$ is switched on/off corresponding to a reset gate signal inputted from the outside, and the converter 9 is reset when the switch $S_{rst}$ is turned on. The switch $S_{tra}$ short-circuits the variable gain integrator 6 and the converter 9 corresponding to a transfer gate signal inputted from the outside.

The number of capacitors C connected to the integration node 70 is changed corresponding to the second gain control signal, and the variable gain integrator 6 changes a current/voltage conversion gain. A capacity value of the variable capacity Cf serving as a feedback capacity of the amplifier 90 is changed corresponding to the third gain control signal, and the converter 9 converts a gain of an output voltage in the case of transferring electric charges charged in the integration node 70. For example, when the selection switch $S_{s1}$ is turned on and the capacitor $C_1$ is connected to the integration node 70, the converter 9 converts a gain of a voltage output by electric charges charged in the capacitor $C_1$ Cf/$C_1$ times.

Figure 12:
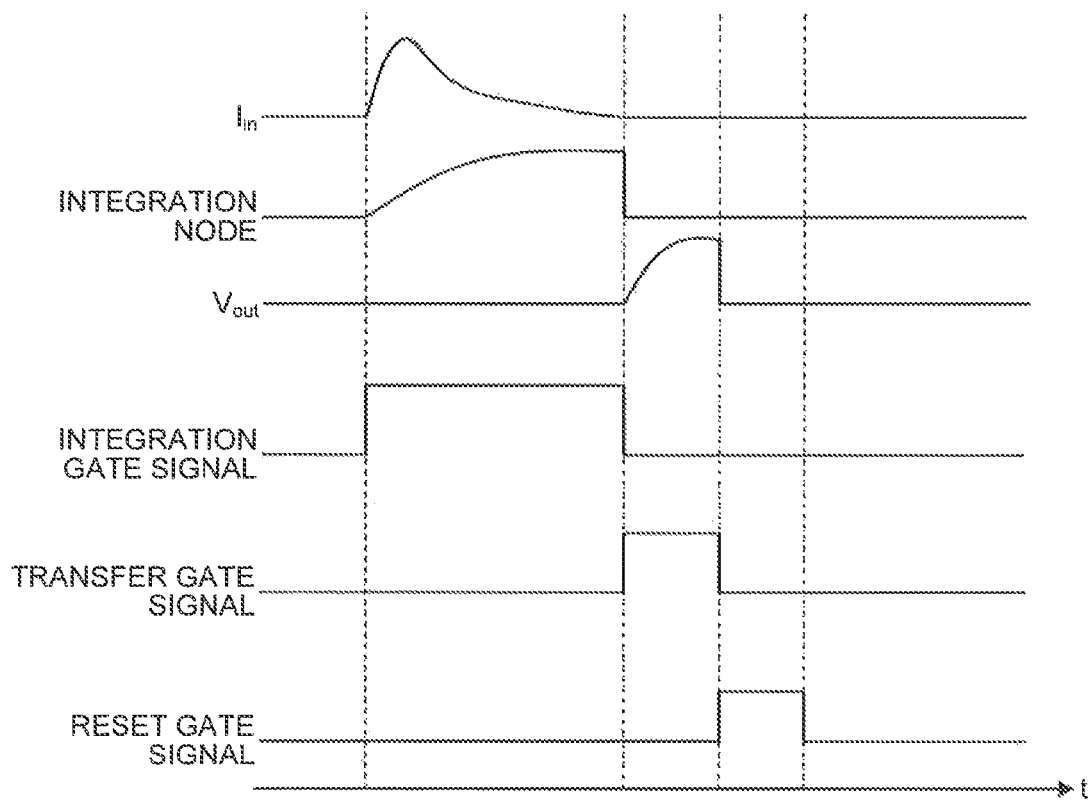

FIG. 12 is a timing chart illustrating the operation of the variable gain integrator 6 and the like in the second integrated circuit in the modification illustrated in FIG. 11. As illustrated in FIG. 12, while the switch $S_{in}$ is turned on corresponding to the integration gate signal, input current $I_{in}$ (output current $I_{out}$ of the current buffer 1) is inputted to the integration node 70, and electric charges due to the input current $I_{in}$ are stored in the storage 8. In other words, the integration node 70 is charged.

When the switch $S_{in}$ is turned off corresponding to the integration gate signal, the switch $S_{tra}$ is turned on corresponding to the transfer gate signal. Electric charges charged in the integration node 70 are converted into a voltage and the converted voltage is output to the converter 9. When the switch $S_{tra}$ is turned off corresponding to the transfer gate signal, the switch $S_{rst}$ is turned on corresponding to the reset gate signal and the converter 9 is reset.

Figure 13:
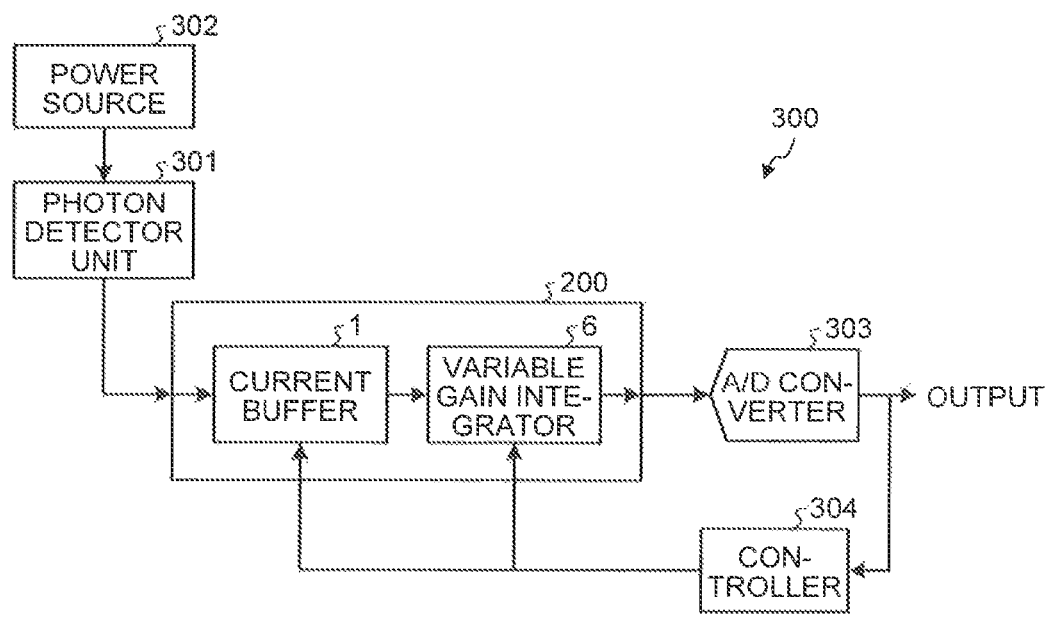
FIG. 13 is a view illustrating a configuration example of a photon detector including the current integrator.

The following describes a photon detector 300 including the current integrator 200. FIG. 13 is a view illustrating a configuration example of the photon detector 300 including the current integrator 200. The photon detector 300 includes a photon detector (photoelectric converter) 301, a power source (voltage supply unit) 302, the current integrator 200, an analog-to-digital (A/D) converter 303, and a controller 304.

The photon detector 301 is, for example, a silicon photomultiplier (SiPM) where a plurality of avalanche photodiodes (APDs) connected in series to corresponding quenching resistors are two-dimensionally disposed. The photon detector 301 can count the number of photons by, for example, generating a pulse (photon counter signal) that indicates an amount of electric charges corresponding to the number of incident photons and outputting current combined with the pulse. The photon detector 301 may be any other detector including a carrier multiplication mechanism such as a photomultiplier tube.

The power source 302 supplies a certain voltage to the photon detector 301. The A/D converter 303 analog-to-digital-converts (A/D-converts) a voltage output from the current integrator 200. The controller 304 controls each of the units forming the photon detector 300. Especially when a voltage range inputted to the A/D converter 303 is different from a dynamic range of the A/D converter 303, the controller 304 outputs at least one of the first gain control signal and the second gain control signal to the current integrator 200 to perform control so as to cause the voltage range inputted to the A/D converter 303 to be close to the dynamic range of the A/D converter 303.

When radiation is detected using the photon detector 300, the radiation is incident on a phosphor such as a scintillator and the photon detector 300 detects photons generated by the phosphor. The number of photons generated by a phosphor is proportional to energy of radiation that is incident on the phosphor. Accordingly, energy of radiation can be measured by counting pulses generated by an APD and the like corresponding to the number of photons generated by a phosphor.

Figure 14:
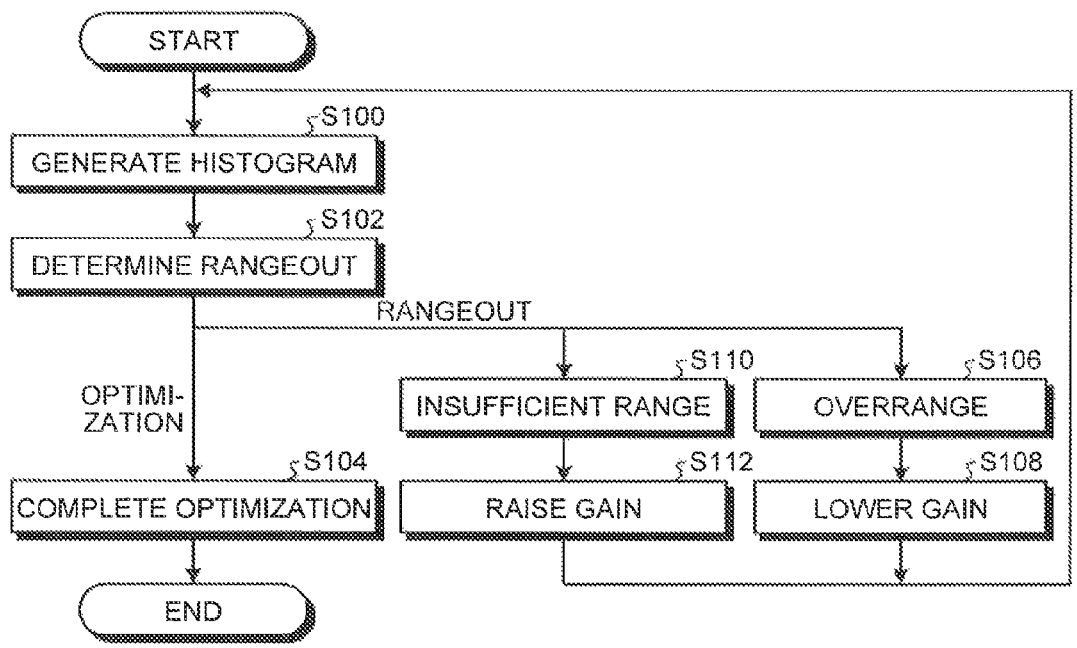
FIG. 14 is a view illustrating processing performed by the photon detector in order to cause an input voltage range to be close to a dynamic range of an analog-to-digital (A/D) converter.
Figure 15:
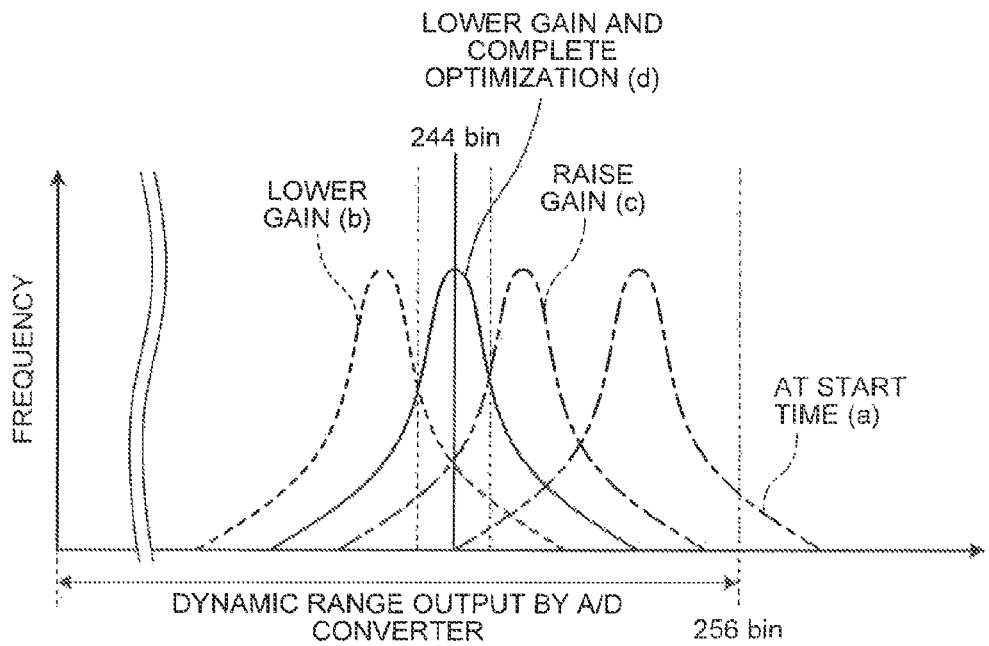
FIG. 15 is a graph illustrating a process of the processing performed by the photon detector in order to cause an input voltage range to be close to a dynamic range of the A/D converter.

The following describes processing (optimization) performed by the photon detector 300 in order to cause a voltage range inputted to the A/D converter 303 to be close to a dynamic range of the A/D converter 303. FIG. 14 is a view illustrating processing performed by the photon detector 300 in order to cause a voltage range inputted to the A/D converter 303 to be close to a dynamic range of the A/D converter 303. FIG. 15 is a graph illustrating a process of the processing performed by the photon detector 300 in order to cause a voltage range inputted to the A/D converter 303 to be close to a dynamic range of the A/D converter 303.

When control is performed such that a voltage range inputted to the A/D converter 303 is close to a dynamic range of the A/D converter 303, for example, any desired radiation source emitting radiation photons of specific energy is used as a reference light source. The photon detector 300 causes the current integrator 200 to amplify output from the photon detector 301 receiving radiation photons, and the photon detector 300 displays a result of analog-to-digital (A/D) conversion performed by the A/D converter 303 in a histogram (generates a histogram of the result) (S100 in FIG. 14).

The controller 304 determines whether a voltage range inputted to the A/D converter 303 is a range suitable for a dynamic range of the A/D converter 303 (determines whether it is out of range) (S102). If a voltage range inputted to the A/D converter 303 is a range suitable for a dynamic range of the A/D converter 303, the controller 304 determines an output range of the current integrator 200 and completes optimization of the range (S104).

If a voltage range inputted to the A/D converter 303 is not a range suitable for a dynamic range of the A/D converter 303 (out of range), the controller 304 outputs at least one of the first gain control signal and the second gain control signal to the current integrator 200 to perform control so as to cause a voltage range inputted to the A/D converter 303 to be close to a dynamic range of the A/D converter 303.

In other words, when a voltage range inputted to the A/D converter 303 exceeds a dynamic range of the A/D converter 303 (overrange) (S106), the controller 304 lowers a gain of the current integrator 200 (S108) and performs the processing at S100. When a voltage range inputted to the A/D converter 303 is insufficient for a dynamic range of the A/D converter 303 (insufficient range; (S110), the controller 304 raises a gain of the current integrator 200 (S112) and performs the processing at S100.

For example, a maximum energy range of radiation photons desired to be acquired by the photon detector 300 is defined as 128 keV. When an output maximum value of the A/D converter 303 in the photon detector 300 is defined as 256 bin, energy assigned to 1 bin is 0.5 keV/bin.

Cobalt is used as a reference light source. Cobalt emits radiation photons having an energy peak at 122 keV. This energy peak corresponds to 244 bin in the output of the A/D converter 303 after optimization. A time when an energy peak of cobalt comes within ±1% with respect to 244 bin is defined as an indicator of the completion of optimization.

The photon detector 300 sets a gain of the current integrator 200 to any desired value before the start of optimization. The photon detector 300 starts the optimization and generates a histogram. The controller 304 uses the generated histogram to determine whether the energy peak of cobalt is out of range of ±1% with respect to 244 bin. For example, the peak is determined to be overrange as illustrated in (a) in FIG. 15.

In the case of overrange, the controller 304 lowers a gain of the current integrator 200. The controller 304 generates a histogram again and determines whether the peak is out of range. For example, the peak is determined to be insufficient for the range as illustrated in (b) in FIG. 15.

In the case of an insufficient range, the controller 304 raises a gain of the current integrator 200. The controller 304 generates a histogram again and determines whether the peak is out of range. For example, the peak is determined to be slightly overrange as illustrated in (c) in FIG. 15.

After the controller 304 lowers a gain of the current integrator 200 again, the energy peak of cobalt comes within ±1% with respect to 244 bin and optimization of a dynamic range is completed as illustrated in FIG. 15(d).

EXAMPLE

Figure 16:
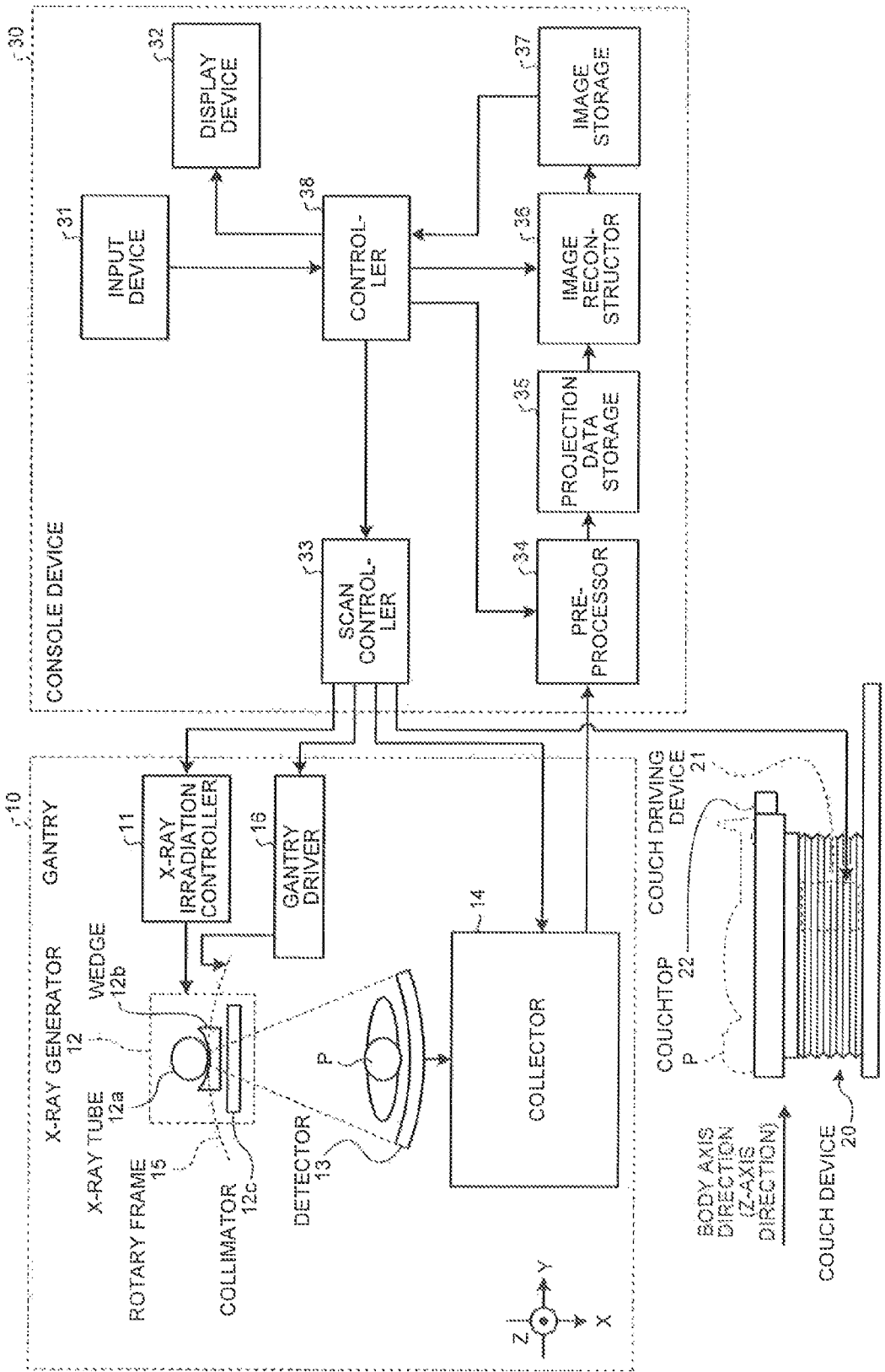
FIG. 16 is a configuration view illustrating a configuration example of a radiation analyzer including a radiation detector.
Figure 17:
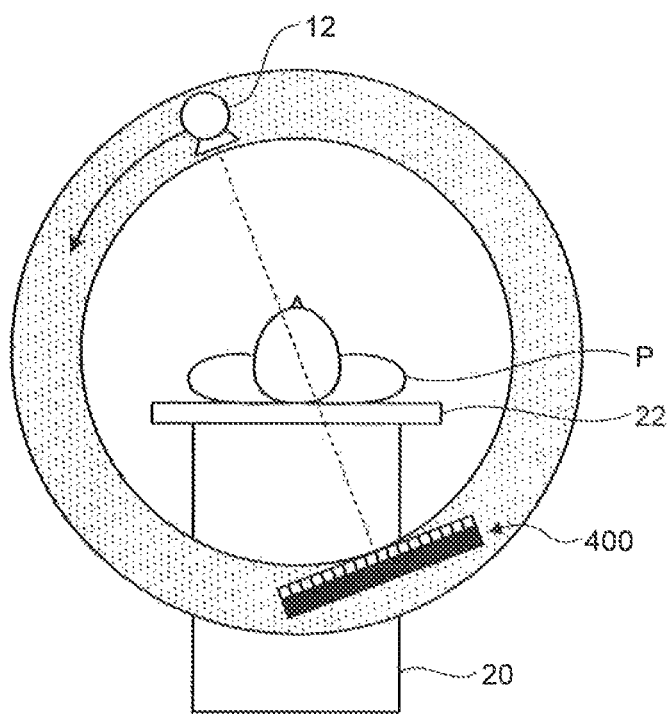
FIG. 17 is a schematic view schematically illustrating a position of the radiation detector in the radiation analyzer.

The following describes a radiation analyzer that includes the photon detector 300 functioning as a radiation detector 400. FIG. 16 is a configuration view illustrating a configuration example of the radiation analyzer that includes the radiation detector 400 including the photon detector 300. FIG. 17 is a schematic view schematically illustrating a position of the radiation detector 400 in the radiation analyzer illustrated in FIG. 16. The radiation analyzer is an X-ray computed tomography (CT) device capable of executing photon counting computed tomography (CT). In other words, the radiation analyzer includes the radiation detector 400, and is a device capable of reconstructing X-ray computed tomography (CT) image data having a high signal-to-noise (SN) ratio by counting photons derived from X-rays that transmit through a subject with photon counting.

Each of photons includes different energy. In the photon counting CT, information on an energy component of X-rays can be obtained by counting an energy value of photons. In the photon counting CT, data collected by irradiating the data with X-rays at one kind of tube voltage can be imaged, divided into a plurality of energy components.

As illustrated in FIG. 16, the radiation analyzer includes a gantry 10, a couch device 20, and a console device 30.

The gantry 10 is a device for irradiating a subject P with X-rays and counting the X-rays that transmit through the subject P, and includes an X-ray irradiation controller 11, an X-ray generator 12, a detector 13 (including the radiation detector 400), a collector 14, a rotary frame 15, and a gantry driver 16.

The rotary frame 15 supports the X-ray generator 12 and the detector 13 so that the X-ray generator 12 and the detector 13 face each other across the subject P, and is an annular frame that is driven to rotate at high speed on a circular path centering the subject P by the gantry driver 16, which will be described later.

The X-ray generator (radiation source) 12 is a device for generating X-rays and irradiating the subject P with the generated X-rays, and includes an X-ray tube 12a, wedges 12b, and a collimator 12c.

The X-ray tube 12a is a vacuum tube for irradiating the subject P with X-ray beams at a high voltage supplied from the X-ray irradiation controller 11, which will be described later, and irradiates the subject P with X-ray beams along with the rotation of the rotary frame 15. The X-ray tube 12a generates the expanding X-ray beams with a fan angle and a cone angle.

The wedge 12b is an X-ray filter for adjusting an X-ray amount of X-rays emitted from the X-ray tube 12a. Specifically, the wedge 12b is a filter for transmitting and attenuating X-rays emitted from the X-ray tube 12a so that the X-rays emitted from the X-ray tube 12a to the subject P are distributed as previously specified.

For example, the wedge 12b is a filter where aluminum is processed so that the wedge 12b has a certain target angle and certain thickness. A wedge may be referred to as a wedge filter and as a bow-tie filter. The radiation analyzer includes a plurality of kinds of wedges 12b that are switched corresponding to photographing conditions. For example, the X-ray irradiation controller 11, which will be described later, switches the wedges 12b corresponding to photographing conditions. For example, the X-ray generator 12 includes two kinds of wedges.

The collimator 12c is a slit for narrowing down an irradiation range of X-rays whose amount is adjusted by the wedges 12b based on the control of the X-ray irradiation controller 11, which will be described later.

The X-ray irradiation controller 11 is a device for supplying a high voltage to the X-ray tube 12a as a high voltage generator, and the X-ray tube 12a generates X-rays with a high voltage supplied from the X-ray irradiation controller 11. The X-ray irradiation controller 11 adjusts a tube voltage and tube current supplied to the X-ray tube 12a so as to adjust an amount of X-rays with which the subject P is irradiated.

The X-ray irradiation controller 11 switches the wedges 12b. The X-ray irradiation controller 11 adjusts the aperture of the collimator 12c so as to adjust an X-ray irradiation range (fan angle and cone angle). The radiation analyzer may allow an operator to manually switch a plurality of kinds of wedges.

The gantry driver 16 rotates and drives the rotary frame 15 to swivel the X-ray generator 12 and the detector 13 on a circular path centering the subject P.

The detector 13 includes the radiation detector 400 at a position illustrated in FIG. 17, and outputs, whenever an X-ray is incident, a signal capable of measuring an energy value of the X-ray. The radiation detector 400 detects a photon generated by an X-ray being incident on an unillustrated phosphor using a plurality of avalanche photodiode (APD) pixels. X-rays are, for example, emitted from the X-ray tube 12a and transmit through the subject P. The radiation analyzer performs arithmetic processing so as to measure an energy value of radiation detected by the radiation detector 400.

The collector 14 (see FIG. 16) collects counting information that is a result of counting processing with output signals of the detector 13. In other words, the collector 14 distinguishes individual signals output from the detector 13, and collects the counting information. The counting information is information that is collected from individual signals output from the detector 13 whenever an X-ray emitted from the X-ray tube 12a and transmitting through the subject P is incident. Specifically, the counting information is information where a counted value of and an energy value of X-rays being incident on the detector 13 are associated. The collector 14 transmits the collected counting information to the console device 30.

The couch device 20 is a device on which the subject P is loaded, and includes a couchtop 22 and a couch driving device 21. The couchtop 22 is a plate on which the subject P is loaded, and the couch driving device 21 moves the couchtop 22 in the z-axis direction and moves the subject P into the rotary frame 15.

The gantry 10 executes, for example, a helical scan where the rotary frame 15 is rotated while the couchtop 22 is moved and the subject P is spirally scanned. The gantry 10 executes a conventional scan where the rotary frame 15 is rotated while a position of the subject P is fixed after movement of the couchtop 22 and the subject P is scanned on a circular path. Or, the gantry 10 executes a step-and-shoot method where a position of the couchtop 22 is moved at certain intervals and the conventional scan is performed at a plurality of scan areas.

The console device 30 is a device that receives operation of the radiation analyzer operated by an operator and reconstructs X-ray CT image data using the counting information collected by the gantry 10. The console device 30 includes an input device 31, a display device 32, a scan controller 33, a preprocessor 34, a projection data storage 35, an image reconstructor 36, an image storage 37, and a controller 38.

The input device 31 includes a mouse, a keyboard and the like used for inputting various kinds of instructions and various kinds of settings by an operator of the radiation analyzer, and transfers information on the instruction and setting received from an operator to the controller 38. For example, the input device 31 receives photographing conditions of X-ray CT image data, reconstructing conditions in reconstructing X-ray CT image data, image processing conditions on X-ray CT image data and the like from an operator.

The display device 32 is a monitor referred to by an operator, and, under the control of the controller 38, displays X-ray CT image data to an operator and displays graphical user interfaces (GUIs) for receiving various kinds of instructions and various kinds of settings from an operator through the input device 31.

Under the control of the controller 38, which will be described later, the scan controller 33 controls the operation of the X-ray irradiation controller 11, the gantry driver 16, the collector 14, and the couch driving device 21 so as to control processing for collecting the counting information in the gantry 10.

The preprocessor 34 performs correction processing such as logarithmic conversion processing, offset correction, sensitivity correction, and beam hardening correction on the counting information transmitted from the collector 14 so as to generate projection data.

The projection data storage 35 stores therein the projection data generated by the preprocessor 34. In other words, the projection data storage 35 stores therein projection data for reconstructing X-ray CT image data (corrected counting information). Hereinafter, the projection data may be described as the counting information.

The image reconstructor 36 uses the projection data stored in the projection data storage 35 to reconstruct X-ray CT image data. Various kinds of methods are developed as the reconstructing method, for example, reverse projection processing. Examples of the reverse projection processing include reverse projection processing based on the filtered back projection (FBP) method. The image reconstructor 36 performs various kinds of image processing on X-ray CT image data so as to generate image data. The image reconstructor 36 stores reconstructed X-ray CT image data and image data generated by various kinds of image processing in the image storage 37.

The projection data that is generated from the counting information obtained by the photon counting CT includes energy information on X-rays attenuated by transmitting through the subject P. Accordingly, the image reconstructor 36 can reconstruct, for example, X-ray CT image data for a specific energy component. The image reconstructor 36 can also reconstruct, for example, X-ray CT image data for individual energy components.

The image reconstructor 36 also allocates, for example, a color tone corresponding to each energy component to each pixel in X-ray CT image data for the energy component so as to generate a plurality of X-ray CT image data classified by color corresponding to the energy component. In addition, the image reconstructor 36 can generate image data by superposing the X-ray CT image data on each other.

The image reconstructor 36 utilizes a K absorption end inherent to a substance so as to generate image data capable of identifying the substance. In the front and back of a K absorption end, attenuation coefficients of an X-ray are greatly different, and counted values largely vary as well. For example, the image reconstructor 36 generates differential image data obtained by differentiating image data having counting information on an energy area smaller than a K absorption end reconstructed and image data having counting information on an energy area larger than the K absorption end reconstructed. For example, differential image data generated with a K absorption end that has a contrast agent as a main component is an image in which an area where the contrast agent exists is mainly drawn. Other examples of image data generated by the image reconstructor 36 include monochromatic X-ray image data, density image data, and an effective atomic number image data.

The controller 38 controls the operation of the gantry 10, the couch device 20, and the console device 30 so as to control the whole radiation analyzer. Specifically, the controller 38 controls the scan controller 33 so as to control a computed tomography (CT) scan performed on the gantry 10. The controller 38 also controls the preprocessor 34 and the image reconstructor 36 so as to control image reconstructing processing and image generating processing in the console device 30. The controller 38 controls the display device 32 to display various kinds of image data stored in the image storage 37.

The radiation detector 400 (photon detector 300) is also used for devices other than the X-ray CT device. For example, the radiation detector 400 is used for nuclear medical imaging devices such as an X-ray diagnostic device, a position emission computed tomography (PET) device, and a single photon emission computed tomography (SPECT) device, and a "PET-CT device" and a "SPECT-CT device" that combine the X-ray CT device and the nuclear medical imaging device. The radiation detector 400 may be used as a light receiving unit of the PET device, and may form a device combined with a magnetic resonance imaging (MRI) device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A circuit comprising:
   a shunt configured to shunt input current into a plurality of current paths; and
   a controller configured to control a gain of the input current inputted to the shunt in accordance with a received first signal by combining current that is shunted into the current paths by the shunt or changing a shunt ratio with which the shunt shunts the input current into the plurality of current paths, wherein the controller is configured to change the shunt ratio by changing an amount of current flowing through at least one of the plurality of current paths.

2. The circuit according to claim 1, wherein each of the current paths includes a transistor where a certain voltage is applied to a gate to cause drain current to flow.

3. The circuit according to claim 2, wherein the shunt further includes a regulation amplifier applying the certain voltage to each gate of the transistors corresponding to a reference voltage.

4. The circuit according to claim 1, wherein
   the controller is configured to control a gain of the input current inputted to the shunt by discarding current flowing through at least one of the current paths through a transistor functioning as a diode.

5. The circuit according to claim 1, further comprising:
   a variable gain integrator configured to integrate current whose gain is controlled by the controller in response to a received second signal and to convert the current into a voltage whose gain is controlled.

6. The circuit according to claim 5, further comprising a converter configured to convert a gain of the voltage converted by the variable gain integrator and to convert impedance of the variable gain integrator.

7. A photon detector comprising:
a photon detector configured to output current to the circuit according to claim 5 corresponding to an incident photon;
a voltage supply configured to supply a voltage to the photon detector;
an analog-to-digital (A/D) converter configured to convert a voltage into which the circuit according to claim 6 controls a gain of the current and converts the current; and
a second controller configured to control a voltage range inputted to the A/D converter to a dynamic range of the A/D converter by outputting at least one of the received first signal and the received second signal to the circuit according to claim 5 when the voltage range inputted to the A/D converter is different from the dynamic range of the A/D converter.

8. A radiation analyzer comprising:
a radiation source; and
the photon detector according to claim 7 detecting photons resulting from radiation emitted from the radiation source.

* * * * *